United States Patent
Ding et al.

(10) Patent No.: US 11,721,016 B2
(45) Date of Patent: Aug. 8, 2023

(54) METHOD AND EQUIPMENT FOR CLASSIFYING HEPATOCELLULAR CARCINOMA IMAGES BY COMBINING COMPUTER VISION FEATURES AND RADIOMICS FEATURES

(71) Applicant: Zhejiang University, Hangzhou (CN)

(72) Inventors: Yong Ding, Hangzhou (CN); Shijian Ruan, Hangzhou (CN); Jiayuan Shao, Hangzhou (CN); Yue Dai, Hangzhou (CN); Yiting Ruan, Hangzhou (CN)

(73) Assignee: Zhejiang University, Hangzhou (CN)

( * ) Notice: Subject to any disclaimer, the term of this patent is extended or adjusted under 35 U.S.C. 154(b) by 268 days.

(21) Appl. No.: 17/139,910

(22) Filed: Dec. 31, 2020

(65) Prior Publication Data

US 2021/0200988 A1    Jul. 1, 2021

(51) Int. Cl.
| | |
|---|---|
| *G06K 9/00* | (2022.01) |
| *G06T 7/00* | (2017.01) |
| *G06V 20/69* | (2022.01) |
| *G06V 10/74* | (2022.01) |
| *G06V 10/46* | (2022.01) |
| *G06V 10/50* | (2022.01) |
| *G06V 10/52* | (2022.01) |

(52) U.S. Cl.
CPC .......... *G06T 7/0012* (2013.01); *G06V 10/462* (2022.01); *G06V 10/50* (2022.01); *G06V 10/52* (2022.01); *G06V 10/761* (2022.01); *G06V 20/695* (2022.01); *G06V 20/698* (2022.01); *G06T 2207/30056* (2013.01); *G06T 2207/30096* (2013.01)

(58) Field of Classification Search
CPC .. G06V 20/698; G06V 20/695; G06T 7/0012; G06T 2207/30056; G06T 2207/30096
See application file for complete search history.

(56) References Cited

U.S. PATENT DOCUMENTS

| | | | |
|---|---|---|---|
| 2017/0053090 A1* | 2/2017 | Viswanath | G06V 10/758 |
| 2017/0193655 A1* | 7/2017 | Madabhushi | G06T 7/0012 |
| 2017/0357844 A1* | 12/2017 | Comaniciu | G16H 50/50 |
| 2018/0165806 A1* | 6/2018 | Eusemann | G06T 7/0012 |
| 2019/0108632 A1* | 4/2019 | Boroczky | G16H 50/30 |
| 2019/0159745 A1* | 5/2019 | Madabhushi | A61B 6/5217 |
| 2019/0172197 A1* | 6/2019 | Buckler | G06V 10/457 |

\* cited by examiner

*Primary Examiner* — Edward F Urban
*Assistant Examiner* — Duy Tran
(74) *Attorney, Agent, or Firm* — Berkeley Law & Technology Group, LLP

(57) ABSTRACT

The present disclosure discloses a method and equipment for classifying hepatocellular carcinoma images by combining computer vision features and radiomics features, wherein the method comprising: 1) collecting eligible clinical images of patients and preprocessing the collected images; 2) extracting computer vision features from a segmented image of a hepatic tumor region; 3) extracting the manual radiomics features from the segmented image of the hepatic tumor region; 4) by combining the computer vision features and the radiomics features, screening by univariate filtering and then by LASSO regression; 5) using the features resulted from screening and clinical features together for modeling by a multivariable logistic regression model, and using the Akaike information criterion (AIC) to search backward and select clinical features suitable for the best model, so as to implement the prediction of hepatocellular carcinoma pathological grading.

6 Claims, 2 Drawing Sheets

METHOD AND EQUIPMENT FOR CLASSIFYING HEPATOCELLULAR CARCINOMA IMAGES BY COMBINING COMPUTER VISION FEATURES AND RADIOMICS FEATURES

CROSS-REFERENCE TO RELATED APPLICATION

This application is based on and claims priority to Chinese Patent Application No. 201911423879.X, filed on Dec. 31, 2019 and titled "METHOD AND EQUIPMENT FOR CLASSIFYING HEPATOCELLULAR CARCINOMA IMAGES BY COMBINING COMPUTER VISION FEATURES AND RADIOMICS FEATURES", the contents of which are incorporated herein by reference in their entirety.

TECHNICAL FIELD

The present disclosure pertains to the technical field of medical image processing, and particularly relates to a method for preoperative and non-invasive pathological grading of hepatocellular carcinoma by combining computer vision features and radiomics features.

BACKGROUND

Hepatocellular carcinoma is one of key reasons of tumor incidence and death in the world. Hepatocellular carcinoma cases in China account for 50% of the incidence of new cases in the world, which endanger human life and health and cause heavy economic burdens to families and society. In the treatment of hepatocellular carcinoma, an important factor influencing a patient's surgery prognosis and the hepatic transplantation strategy choice is the extent of hepatocellular carcinoma differentiation. Pathological grading is a means to describe such a differentiation extent. Traditionally, the pathological grading of hepatocellular carcinoma may be achieved by tissue biopsy which is, however, controversial in accuracy of the tumor grading performed on tumor samples obtained by biopsy, and accompanied by risks such as tumorigenesis and metastasis. There is an urgent demand for a non-invasive method for doing virtual and digital biopsy, and radiomics is expected to be an effective tool to solve the clinical problem of preoperative evaluation of hepatocellular carcinoma differentiation.

Radiomics refers to converting digitalized medical images containing a large amount of neoplastic pathological and physiological variations into high-dimensional data available for development, and analyzing the information data by quantitative methods to enable the evaluation of factors such as neoplasms diagnosis, therapeutic effect and prognosis, thus improving the clinical decision-making ability. Related studies have shown that it facilitates the pathological grading of hepatocellular carcinoma by extracting radiomics features. However, most of the radiomics features are manual features which are calculated by superficial mathematical formulas and easily affected by noise and low-order image features. In order to overcome these limitations and further explain the inherent heterogeneity of neoplasms, the present disclosure provides a new strategy taking advantage of computer vision features. Computer vision features, including local and global features, have been widely applied in conventional image processing. Compared with manual features, the computer vision features have advantages such as rotation invariance and insensitivity to noise, which are expected to better enable the clinical pathological grading of hepatocellular carcinoma.

SUMMARY

The present disclosure provides a method of preoperative pathological grading of hepatocellular carcinoma by combining computer vision features and radiomics features. The purpose thereof is to utilize the computer vision features from conventional images in combination with manual features from radiomics to design a pathological grading model of hepatocellular carcinoma in accordance with the radiomics research process, build a brand new prediction model, provide useful techniques for evaluating the extent of hepatocellular carcinoma differentiation, and help improve the precise treatment for patients suffering hepatocellular carcinoma.

Implementations in the present disclosure include:

In Step (1), a hepatocellular carcinoma image is obtained from a confirmed hepatocellular carcinoma patient and preprocessed, wherein the preprocessing includes: segmenting a hepatic tumor region in the hepatocellular carcinoma image, re-sampling volume pixels of a segmented image of the hepatic tumor region into a space of a fixed size, normalizing a grey scale thereof, and labeling a corresponding pathological grading result;

In Step (2), computer vision features are extracted from the image of the hepatic tumor region segmented in Step (1), wherein the computer vision features include LoG filter features, LBP features, HOG features, and haar-like features;

In Step (3), radiomics features are extracted from the image of the hepatic tumor region segmented in Step (1), wherein the radiomics features include morphological features, grey scale features, texture features, and wavelet features;

In Step (4), the computer vision features extracted in Step (2) and the radiomics features extracted in Step (3) are jointed together, and screening is performed on features in a merged feature set $X=\{X_1, X_2, \ldots, X_n\}$ resulted from the joint, wherein n represents a number of feature vectors in the set, represents an $i^{th}$ feature vector in the merged feature set $(X_i=\{x_{i1}, x_{i2}, \ldots, x_{im}\})$, represents an $i^{th}$ element in $X_i$, and m represents a number of elements in $X_i$; wherein the screen includes:

In Step (4.1), firstly, single-valued features, features having variances less than a preset threshold, features irrelevant to pathological grading, and redundant features are excluded by univariate filtering;

wherein the relationship intensity between features and pathological grading is measured through mutual information calculations, so that the features having mutual information values lower than the preset threshold are referred to as irrelevant to the pathological grading, and the mentioned calculation formula for mutual information is:

$$I(X_i; Y) = \sum_{y \in Y} \sum_{x \in X_i} p(x, y) \log\left[\frac{p(x, y)}{p(x)p(y)}\right]$$

wherein, $X_i$ represents an $i^{th}$ feature vector in the merged feature set, Y represents a label, p(x, y) is a joint probability density function of X and Y, and p(x) and p(y) are, respectively, marginal probability density functions of X and Y;

The redundant features are those having correlation coefficients greater than 0.9, and the calculation formula for a correlation coefficient is:

$$\rho = \frac{\sum_k (x_{ik} - \overline{x}_i)(x_{jk} - \overline{x}_j)}{\sqrt{\sum_k (x_{ik} - \overline{x}_i)^2 \sum_j (x_{jk} - \overline{x}_j)^2}}$$

wherein, P is a calculated result of the correlation coefficient, $x_{ik}$ represents a $k^{th}$ element in the $i^{th}$ feature vector in the merged feature set, $x_{jk}$ represents a k element in a $j^{th}$ feature vector in the merged feature set, and $\overline{x}_i$ and $\overline{x}_j$ respectively represent mean values of all elements in an $i^{th}$ feature vector and a $j^{th}$ feature vector in the merged feature set;

In Step (4.2), the feature dimension reduction of a Lasso regression model is adopted to train those unhelpful feature parameters to be 0 in order to obtain a sparse solution; and a cost function of the mentioned Lasso regression is:

$$J(\theta) = \frac{1}{2m} \sum_{i=1}^{m} (y^{(i)} - (wx^{(i)} + b))^2 + \lambda \|w\|_1 = \frac{1}{2} MSE(\theta) + \lambda \sum_{i=1}^{n} |\theta_i|$$

wherein, m is a number of samples, n is a number of features, $X^{(i)}$ represents all feature values of the $i^{th}$ sample, $y^{(i)}$ represents a label value of the $i^{th}$ sample, w is a parameter vector of the length n, $\|w_1\|$ represents an L1 norm of the parameter vector w, b represents a constant coefficient, and λ is a parameter for controlling the regression complexity, wherein a best value of λ is selected by taking the binomial deviation as a criterion and then iterated by a 10-fold cross validation method to apply a λ value of the least binomial deviation in the Lasso regression model; and a predict score is obtained by multiplying the LASSO-selected features by their respective coefficients and then summing up the products;

In Step (5), after clinical features are obtained from the hepatic tumor region image and all the clinical features are deleted one by one, a multivariable logistic regression is adopted, by combining the image with all feature matrices resulted from screening in Step (4), to get a classifier for pathological grading of hepatocellular carcinoma for different combinations; the Akaike information criterion (AIC) is used as a criterion to search backward a most proper combination thereof, and then the influence of binomial deviation and the number of variables during selection are put into the comprehensive consideration so as to select a model of the lowest AIC score as the final classifier for pathological grading of hepatocellular carcinoma which may input the best combined feature matrix; and the AIC is defined as:

AIC=−2 ln(L)+2k

Wherein L is the maximum likelihood under this model, and k is a number of model variables;

In Step (6), a hepatocellular carcinoma image is acquired to go through the pathological grading of hepatocellular carcinoma and is preprocessed according to Step (1) to segment an image of a hepatic tumor region from which features of the same type as that of the best combined feature matrix said in Step (5) are extracted as a feature matrix to be graded; and the feature matrix to be graded is input into the classifier for pathological grading of hepatocellular carcinoma obtained in Step (5) to output a pathological grading result of hepatocellular carcinoma.

Further, the computer vision features described in Step (2) include:

A. LoG features: a Gauss-Laplace filter is applied to the input image, and an export image is generated for each specified sigma value. The laplace transformation of the Gauss image is achieved by convolution of the image with a second order derivative (laplace operator) of the Gauss kernel. The Gauss kernel may be used to smooth the image, which is defined as:

$$G(x, y, \sigma) = \frac{1}{(\sigma\sqrt{2\pi})^2} e^{-\frac{x^2+y^2}{2\sigma^2}}$$

The Gauss kernel is obtained by using a laplace kernel $\nabla^2 G(x, y)$ through convolution, and the laplace kernel is sensitive to regions having rapidly changing intensities, thus implementing the marginal enhancement. A bandwidth of a filter in the Gauss kernel is determined by σ which can be used to highlight more refined (a low value of σ) or more coarse (a high value of σ) textures. The LoG filter features are obtained by extracting intensity and texture features in multiple fineness from the LoG-filtered image.

B. LBP features: an original LBP operator is defined in a 3*3 window, a central pixel of which is taken as a threshold to compare with grey scale values of 8 neighbour pixels. If any surrounding pixel value is larger than or equal to the central pixel value, the position of the surrounding pixel is marked as 1, or otherwise 0. In this way, through comparison, 8 points within a 3*3 neighborhood can generate a 8-bit binary number (usually converted in to a decimal number, i. e. LBP code, which has a total of 256 kinds), namely obtaining an LBP value of the central pixel point in the window and using the LBP value to reflect the texture information of this region. The specific LBP expression is as follows:

$$TI(x) = \sum_{p=0}^{P} 2^p \times \text{sgn}(g_c - g_p)$$

wherein, $g_c$ is a grey scale value of a central pixel point in the image, and $g_c$ is a grey scale value of a neighbour pixel point in the image; sgn(x) is a step function, and when x≥0, sgn(x)=1; if x<0, sgn(x)=0. The intensity and texture features are extracted from the LBP image to obtain the LBP features.

C. HOG features: HOG is a feature descriptor algorithm mainly used for object identification in image processing, which synthesizes features by calculating and statistics of the histograms in the gradient direction in local regions of an image. Before performing an HOG algorithm, the image is segmented into smaller sub-regions (referred to as cells), and histograms in the gradient direction are calculated based on pixels in cells. Then the histograms of all cells are combined to form image features. Main steps for calculating HOG include:

a. The gradient calculation, wherein a 1D discrete differential template is used to process the image in both horizontal and vertical directions at the same time. The gradient value can be calculated by the following formula:

$$|\text{Gradient}| = \sqrt{I_x^2 + I_y^2}$$

$$\theta = \arctan\left(\frac{I_y}{I_x}\right)$$

wherein $I_x$ and $I_y$ are gradient values in horizontal and vertical directions.

b. The direction grading, which is to create a cell histogram. An HOG cell may be either round or rectangular, and there may be two kinds of histogram channels at the same time, signed (0-360 degrees) and unsigned (0-180 degrees).

c. Block construction and standardization, wherein respective cells are combined into a large section that is spatially connected. In this way, the HOG descriptor becomes a vector constituted by histogram components of all cell units in all sections. The generated sectional block has two types of geometries, namely an annular HOG and a rectangular HOG. As for the block standardization, an L2 norm is applied for definition as follow:

$$\varphi = \frac{v}{\sqrt{\|v\|_2^2 + e^2}}$$

wherein v is a vector and e is a constant.

D. Haar-like features

After the original image is converted into an integral image, the area of interest is quickly calculated on different scales by using the integral image, a rectangular area is defined at each pixel, and haar features of different types are calculated wherein each haar-like feature descriptor contains two jointed rectangles: a black block and a white block, and the haar-like features are calculated by the following formula:

$$g(x) = \sum_B B\_P - \sum_W W\_P$$

wherein, B represents the black rectangle having a pixel value of B_P; while W represents the white rectangle having a pixel value of W_P.

Further, the radiomics features described in Step (3) include:

A. Morphological features, representing related features about hepatic tumor shapes, wherein various morphological features are calculated as:

a grid surface:

$$A_i = \frac{1}{2} Oa_i \times Ob_i, \quad A = \sum_{i=1}^{N_f} A_i$$

wherein $O_i a_i$ and $O_i b_i$ are edges of the $i^{th}$ triangle in the grid, which are constituted of vertexes $a_i$, $b_i$ and an origin O.

pixel surface:

$$A_{pixel} = \sum_{k=1}^{N_v} A_k$$

The pixel number in the region of interest is multiplied by a surface area of a single pixel $A_k$ approximate a surface area of the region of interest $A_{pixel}$.

perimeter:

$$P = \sum_{i=1}^{N_w} P_i$$

wherein $a_i$ and $b_i$ are vertexes of the $i^{th}$ line in the peripheral grid. A perimeter $P_i$ of each line in the grid circumference is calculated at the first place. Then, a total perimeter P is obtained by summing up all calculated subregions.

perimeter to surface ratio:

$$\text{perimeter to surface ratio} = \frac{P}{A}$$

sphericity:

$$\text{sphericity} = \frac{2\sqrt{\pi A}}{P}$$

spherical disproportion:

$$\text{spherical disproportion} = \frac{P}{2\sqrt{\pi A}}$$

a major axis length: major axis$=4\sqrt{\lambda_{major}}$ $\lambda_{major}$ represents the maximum principal component value resulting from the principal component analysis performed at the physical coordinate of the pixel center in the region of interest; and the major axis length feature produces the maximum axis length of an ellipsoid surrounding the region of interest, which is calculated by using the maximum principal component $\lambda_{major}$;

a minor axis length: minor axis$=4\sqrt{\lambda_{minor}}$ $\lambda_{minor}$ represents the second maximum principal component value resulting from the principal component analysis performed at the physical coordinate of the pixel center in the region of interest; and the minor axis length feature produces the second maximum axis length of an ellipsoid surrounding the region of interest, which is calculated by using the second maximum principal component $\lambda_{minor}$;

elongation:

$$\text{elongation} = \sqrt{\frac{\lambda_{minor}}{\lambda_{major}}}$$

Elongation shows the relation between two maximum principal components in the region of interest.

B. First-order features (grey statistical features): grey statistical features are features resulting on the basis of the intensity histogram, which describe the distribution of pixel intensities within the hepatic tumor region. The following formula represents the definition of the intensity histogram:

$$H(i) = \frac{n_i}{N_p}, i = 1, 2, \ldots N_g$$

$i=1, 2, \ldots N_g$ wherein, i represents a discrete intensity level, $N_p$ represents a total number of pixels in a hepatic tumor region image, $N_g$ represents a number of discrete intensity level types, $n_i$ represents a number of pixels of the discrete intensity level i in the hepatic tumor region image, H(i) represents the occurrence frequency of pixels having the discrete intensity level i in the hepatic tumor region image; in addition, M is made represent a pixel value set of all pixels in the hepatocellular carcinoma tumor region, and M(i) represents a pixel value of a $i^{th}$ pixel; The grey statistical features mentioned above include:
energy:

$$\text{energy} = \sum_{i=1}^{N_p}[M(i) + c]^2,$$

wherein c is optional for representing a moving pixel intensity to prevent any negative value from occurring in M;
total energy:

$$\text{total energy} = V_{voxel}\sum_{i=1}^{N_p}[M(i) + c]^2;$$

an entropy:

$$\text{entropy} = -\sum_{i=1}^{N_g}H(i)\log_2[H(i) + \varepsilon],$$

wherein $\varepsilon$ represents a random small positive number;
an interquartile range: Interquartile range=$n_{75}$-$n_{25}$ wherein $n_{25}$ and $n_{75}$ represent, respectively, numbers of pixels having discrete intensity levels at $25^{th}$ and $75^{th}$ percentiles;
a mean absolute deviation:

$$MAD = \frac{1}{N_P}\sum_{i=1}^{N_P}|M(i) - \overline{M}|,$$

wherein $\overline{M}$ represents a mean value of pixel values;
a robust mean absolute deviation:

$$rMAD = \frac{1}{N_{10-90}}\sum_{i=1}^{N_{10-90}}|M_{10-90}(i) - \overline{M}_{10-90}|,$$

wherein $M_{10-90}(i)$ represents a pixel value of the $i^{th}$ pixel with a discrete intensity level between $10^{th}$ and $90^{th}$ percentiles, $\overline{M}_{10-90}$ represents a mean value, and $N_{10-90}$ represents a number of types of discrete intensity levels between $10^{th}$ and $90^{th}$ percentiles;
a robust mean absolute deviation is an average distance between each intensity value and each mean value calculated on a subset of pixel matrices having a grey scale between the $10^{th}$ and $90^{th}$ percentiles (included);
skewness:

$$\text{skewness} = \frac{\mu^3}{\sigma^3} = \frac{\frac{1}{N_P}\sum_{i=1}^{N_P}(M(i) - \overline{M})^3}{\left(\sqrt{\frac{1}{N_P}\sum_{i=1}^{N_P}(M(i) - \overline{M})^2}\right)^3};$$

kurtosis $$\text{kurtosis} = \frac{\mu^4}{\sigma^4} = \frac{\frac{1}{N_P}\sum_{i=1}^{N_P}(M(i) - \overline{M})^4}{\left(\frac{1}{N_P}\sum_{i=1}^{N_P}(M(i) - \overline{M})^2\right)^2};$$

uniformity:

$$\text{uniformity} = \sum_{i=1}^{N_g}N(i)^2;$$

In addition, there are commonly used first-order statistical features including maximums, minimums, mean values, variances, and standard deviations, which are not repeated herein.

C. Second-order features (texture features): for a texture feature analysis, the features are extracted by using a grey-level co-occurrence matrix (GLCM), a grey-level run-length matrix (GLRLM), a grey-level size-zone matrix (GLSZM), and a neighborhood grey-tone difference matrix (NGTDM) of an image to describe the texture distribution within the hepatic tumor.

GLCM: is to calculate a grey scale relationship between adjacent volume pixels in the hepatic tumor region to characterize the texture of the image. A GLCM sized as $N_g \times N_g$ describes a second-order joint probability function of an image region limited by a mask, which is defined as P(i, j|δ, θ). A (i, j)$^{th}$ element in this matrix represents a number of times that a combination of a pixel at the $i^{th}$ grade and a pixel at the $j^{th}$ grade occurs along an angle θ in the image which are separated apart by δ pixels. δ of the central pixel is defined as a distance having infinite norms.

GLRLM: is to analyze the relationship between pixels of a same intensity in the space to characterize the stripe texture of the image. A grey-level run length is defined as a number length of successive pixels having a same grey-level value. In the grey-level run length matrix P(i, j|θ), the (i, j)$^{th}$ element describes a number of run lengths that the $i^{th}$ grey scale and the $j^{th}$ length occur in the image (ROI) along an angle θ.

GLSZM: is to use a grey-level size zone to quantize a grey-level zone in the image. The grey-level zone is defined as a number of connected pixels sharing the same grey-scale intensity. According to infinite norms, if a distance is 1 (8 connected zones in 2D, and 26 connected zones in 3D), the pixels are regarded as connected. In the grey-level size zone matrix P(i, j), the (i, j)$^{th}$ element equals to a number of zones occurring in the image that have the $i^{th}$ grey scale and the $j^{th}$ dimension. The grey-level size zone matrix is independent of rotation, in contrast to the grey-level co-occurrence matrix and GLRLM matrix, and only calculates one matrix in each of all directions in the region of interest.

NGTDM: is to describe the visual texture property based on a certain volume pixel and its neighborhood. A neighborhood grey-tone difference matrix quantizes the difference between a neighborhood grey scale value and a mean grey scale value within the distance $\delta$. A sum of absolute differences of the $i^{th}$ grey scale is stored in the matrix. Assuming that $X_{gl}$ is a group of segmented volume pixels, if $x_{gl}(j_x, j_y, j_z) \in X_{gl}$ is a grey scale of a volume pixel at the position $(j_x, j_y, j_z)$, a mean grey scale in the neighborhood will be:

$$\bar{A}_i = \bar{A}(j_x, j_y, j_z) = \frac{1}{W} \sum_{k_x=-\delta}^{\delta} \sum_{k_y=-\delta}^{\delta} \sum_{k_z=-\delta}^{\delta} x_{gl}(j_x + k_x, j_y + k_y, j_z + k_z)$$

wherein $(j_x, j_y, j_z) \neq (0, 0, 0)$ and $x_{gl}(j_x+k_x, j_y+k_y, j_z+k_z) \in X_{gl}$. W is the number of pixels in the region.

D. wavelet features: to filter an original 2D image by non-sampling 2D (two dimensional) wavelet transformation. The 2D image is considered as being constituted by a series of row vectors, and upon the wavelet filtering the original signal is segmented into two parts, high-frequency signals and low-frequency signals, which are then down sampled. The elements of row vectors subscripted by even numbers are reserved, so that the high frequency part obtains a corresponding high frequency matrix, and the low frequency signal part obtains a new low frequency matrix. Newly generated matrices respectively go through wavelet filtering and down sampling one more time for column vectors in order to obtain three high-frequency signals and a low-frequency signal The above mentioned processes are then performed on the low-frequency signal for $J_{dec}$ times to finally obtain $J_{dec} \times 3$ high-frequency signals and a low-frequency approximated image. A modulus square expression of the Daubechies wavelet applied is:

$$|m_0(\omega)|^2 = [\cos^2(\omega/2)]^N P[\sin^2(\omega/2)]$$

wherein, the wavelet has a discrete version as $$m_0(\omega) = \frac{1}{\sqrt{2}} \sum_{k=0}^{2N-1} h_k e^{-jk\omega},$$

$$P(y) = \sum_{k=0}^{N-1} C_k^{N-1+k} y^k,$$

$\omega$ is an angular vector, and $h_k$ is a parameter. The wavelet features are obtained by extracting intensity and texture features on multiple scales from the image resulting from the wavelet decomposition.

Another purpose of the present disclosure is to provide a piece of equipment for classifying hepatocellular carcinoma images by combining computer vision features and radiomics features, wherein the equipment includes:

a sampling module, used for segmenting the hepatic tumor region in the hepatocellular carcinoma image, resampling volume pixels of a segmented image of the hepatic tumor region into a space of a fixed size, normalizing a grey scale thereof, labeling the sample, and regarding the hepatic tumor region image containing the result label as a training set;

a feature extraction module, used for extracting computer vision features, radiomics features, and clinical features from the hepatic tumor region obtained by the sampling module; jointing the computer vision feature set and the radiomics feature set together to finally obtain a merged feature set and a clinical feature set after the joint of the computer vision feature set and the radiomics feature set;

a feature screening module, used for screening the merged feature set after joint, and combining and screening the feature set resultant from screening and the clinical feature set to obtain a final feature combination; and a classification module, used for classification according to the final feature combination.

In the present disclosure, preferably, the sampling module includes:

a segmenting sub-module: used to segment a hepatic tumor region in the hepatocellular carcinoma image; and a pre-processing sub-module: resampling the volume pixels of the segmented hepatic tumor region image into a space of a fixed size, normalizing the grey scale and labeling the sample.

In the present disclosure, preferably, the feature extraction module includes:

a sub-module of computer vision feature extraction: used for extracting computer vision features including LoG filter features, LBP features, HOG features and haar-like features;

a sub-module of radiomics feature extraction: used for extracting radiomics features including morphological features, grey scale features, texture features, and wavelet features;

a sub-module of clinical feature extraction: used for extracting clinical features;

a sub-module of feature joint: used for jointing the computer vision feature set and the radiomics feature set to form a merged feature set.

In the present disclosure, preferably, the feature screening module includes:

a sub-module of the first-level feature screening: used for excluding single-valued features, features having variances less than a preset threshold, features having mutual information values less than a preset threshold, and features of correlation coefficients larger than 0.9; and a sub-module of the second level feature dimension reduction: used for adopting the feature dimension reduction in a Lasso regression model, and training unhelpful feature parameters to 0, so as to obtain a sparse solution and thus the merged feature set that has gone through screening.

Another purpose of the present disclosure is to provide a piece of equipment for classifying hepatocellular carcinoma images by combining computer vision features and radiomics features, wherein the equipment includes a storage and a processor:

the storage is used for storing a computer program; and the processor, when performing the computer program, is used for implementing the method for classifying the hepatocellular carcinoma images by combining the computer vision features and the radiomics features according to any one of schemes mentioned above.

Another purpose of the present disclosure is to provide a computer-readable storage medium that has a computer program is stored thereon and, when executed by a processor, implements the method for classifying the hepatocellular carcinoma images by combining the computer vision features and the radiomics features according to any scheme mentioned above.

The present disclosure is beneficial in:

The present disclosure provides a complete method for pathological grading of hepatocellular carcinoma by combining the computer vision features and the radiomics features, including data acquisition and preprocessing, computer vision feature extraction, radiomics feature extraction, feature screening, and modeling. Finally, the present disclosure obtains a pathological grading model of hepatocellular carcinoma that can be adapted to different types of features and clinical features. Compared with other classification models that have been tried in medical diagnosis field, the present disclosure owns its originality and specificity in algorithm and application, and has more superior performance in distinguishing subtle differences. Experimental results have shown that the model can effectively predict the pathological grade of hepatocellular carcinoma before the surgery, and can be conveniently used as a preoperative evaluation tool to help surgeons customize individualized preoperative treatment schemes and prognosis evaluation in the future.

DESCRIPTION OF THE EMBODIMENTS

Figure 1:
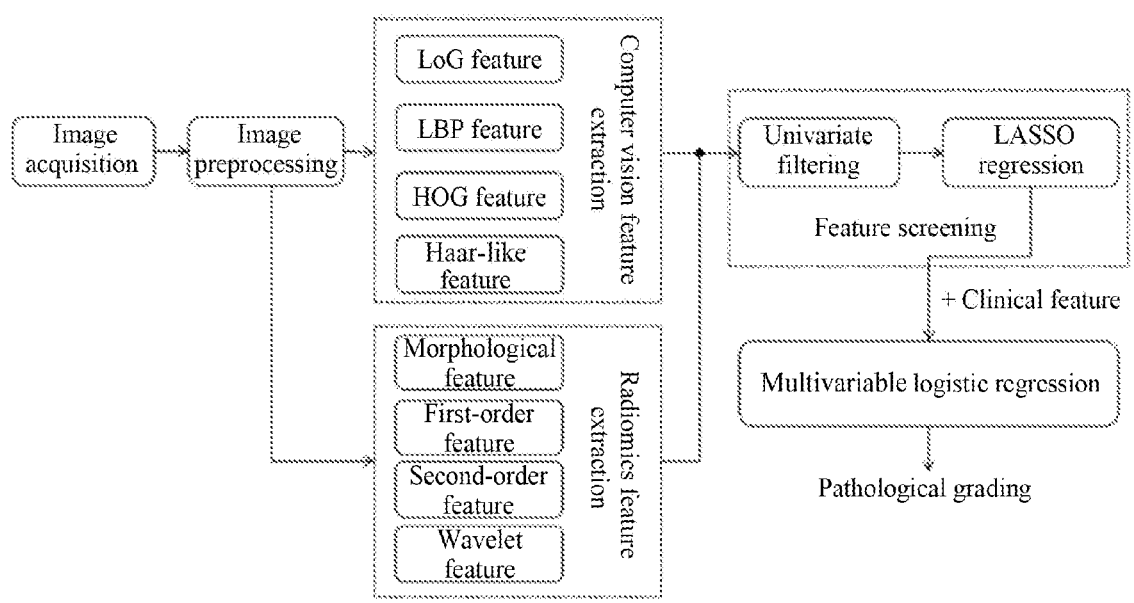
FIG. 1 is a flow chart of a method for classifying hepatocellular carcinoma images by combining computer vision features and radiomics features.

The method provided in the present disclosure will be further described with reference to figures below.

In Step (1), hepatocellular carcinoma image data is obtained from a patient and the image is preprocessed.

Inclusion criteria of data: hepatocellular carcinoma is clearly diagnosed and graded pathologically; hepatic CT plain scan plus enhanced examination shall be performed within one month ahead of the tumor resection; the enhanced examinations all include three phases, including the arterial phase, the portal phase and the delayed phase; clinical and image data are complete and available for re-evaluation.

Exclusion criteria of data: histopathological examination results show cholangiocarcinoma or mixed cell carcinoma; interventional therapy or chemotherapy against hepatocellular carcinoma have been taken before the imaging examination; imaging data or clinical data are missing; the tumor is not clearly displayed in the image enough to delineate the lesion.

Image preprocessing: segmenting of the hepatic tumor region is to be implemented by an experienced radiologist and examined by another experienced radiologist; all volume pixels of the CT image are re-sampled into a space of a fixed size before the feature extraction; grey scales are normalized, and the corresponding pathological grading results are marked as labels.

In Step (2), the computer vision features are extracted from the lesion region segmented in Step (1), wherein the extracted features mainly include the following types:

LoG filter features: a Gauss-Laplace filter is applied to the input image, and an export image is generated for each specified value σ. The laplace transformation of the Gauss image is achieved by convolution of the image with a second order derivative (laplace operator) of the Gauss kernel. The Gauss kernel may be used to smooth the image, which is defined as:

$$G(x, y, \sigma) = \frac{1}{(\sigma\sqrt{2\pi})^2} e^{-\frac{x^2+y^2}{2\sigma^2}} \quad (2\text{-}1)$$

The Gauss kernel is obtained by using a laplace kernel $\nabla^2 G(x, y)$ through convolution. A bandwidth of a filter in the Gauss kernel is determined by σ, and the value of a in the present disclosure is set as 1 mm, 2 mm, 3 mm, 4 mm, and 5 mm to obtain images of different roughnesses. The LoG filter features are obtained by extracting intensity and texture features in multiple kinds of fineness from the LoG-filtered image.

LBP features: an original LBP operator is defined in a 3*3 window, a central pixel of which is taken as a threshold to compare with grey scale values of 8 neighbour pixels. If any surrounding pixel value is larger than or equal to the central pixel value, the position of the surrounding pixel is marked as 1, or otherwise 0. In this way, through comparison, 8 points within a 3*3 neighborhood can generate a 8-bit binary number (usually converted in to a decimal number, i. e. LBP code, which has a total of 256 kinds), namely obtaining an LBP value of the central pixel point in the window and using the LBP value to reflect the texture information of this region. The specific LBP expression is as follows:

$$TI(x) = \sum_{p=0}^{P} 2^p \times \text{sgn}(g_c - g_p) \quad (2\text{-}2)$$

wherein, $g_c$ is a grey scale value of a central pixel point in the image, and $g_s$ is a grey scale value of a neighbour pixel point in the image; sgn(x) is a step function, and when x≥0, sgn(x)=1; if x<0, sgn(x)=0. The intensity and texture features are extracted from the LBP image to obtain the LBP features.

HOG feature: synthesizes features by calculating and counting the histograms in the gradient direction in local regions of the image. Before performing an HOG algorithm, the image is segmented into smaller sub-regions (referred to as cells), and histograms in the gradient direction are calculated on the basis of pixels in cells, and the histograms of all cells are then combined to form image features. Main steps for calculating HOG include:

a. The gradient calculation, wherein a 1D discrete differential template is used to process the image in both horizontal and vertical directions at the same time. The gradient value can be calculated by the following formula:

$$\theta = \arctan\left(\frac{I_y}{I_x}\right) \quad (2\text{-}4)$$

wherein $I_x$ and $I_y$ are gradient values in horizontal and vertical directions.

b. Direction grouping, which is to create a cell histogram. The HOG cell is round in shape, and there may be two kinds of histogram channels at the same time, signed (0-360 degrees) and unsigned (0-180 degrees). In the present disclosure, 9 groups of unsigned histogram channels (in directions 0, 20, 40, 60, 80, 100, 120, 140, 160).

c. Block construction and standardization, wherein respective cells are combined into a large section that is spatially connected. In this way, the HOG descriptor becomes a vector constituted by histogram components of all cell units in all sections. The generated sectional block has two types of geometries, namely an annular HOG and a rectangular HOG. As for the block standardization, an L2 norm is applied for definition as follow:

$$\varphi = \frac{-v}{\sqrt{\|v\|_2^2 + e^2}} \quad (2\text{-}5)$$

wherein v is a vector and e is a constant.

D. Haar-like features

Figure 2:
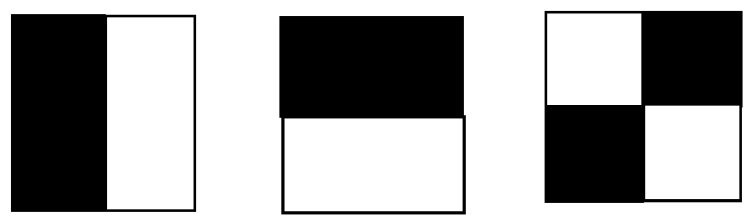
FIG. 2 is a schematic diagram of haar feature extraction.

Haar-like features convert an original image into an integral image, and quickly calculate the area of interest on different scales by using the integral image. The haar-like features are rectangular features which define a rectangular zone at each pixel and may calculate different types of haar features, as shown in FIG. 2:

Each haar-like feature descriptor contains two jointed rectangles: a black bloc and a white block. The haar-like features can be calculated by the following formula:

$$g(x) = \sum_B B\_P - \sum_W W\_P \quad (2\text{-}6)$$

wherein, B represents the black rectangle having a pixel value of B_P; while W represents the white rectangle having a pixel value of W_P.

In Step (3), common manual features in radiomics are extracted from the focal region segmented in Step (1), wherein the extracted features mainly include the following several types:

A. Morphological features, each of which is calculated as:
grid surface area A:

$$A_i = \frac{1}{2} Oa_i \times Ob_i, \quad (3\text{-}1)$$

$$A = \sum_{i=1}^{N_f} A_i$$

wherein $O_i a_i$ and $O_i b_i$ are edges of the $i^{th}$ triangle in the grid, which are constituted of vertexes $a_i$, $b_i$ and an origin O, and $N_j$ represents a number of triangles in the grid.

pixel surface area $$A_{pixel} = \sum_{k=1}^{N_v} A_k \quad (3\text{-}2)$$

wherein $A_k$ represents a surface area of a single pixel $A_k$, and $N_v$ represents a number of pixels;

perimeter P:

$$P_i = \sqrt{(a_i - b_i)^2}, \quad (3\text{-}3)$$

$$P = \sum_{i=1}^{N_w} P_i$$

wherein $a_i$ and $b_i$ are vertexes of the $i^{th}$ line in the peripheral grid. A perimeter $P_i$ of each line in the grid circumference is calculated at the first place. Then, a total perimeter P is obtained by summing up all calculated subregions, wherein $N_w$ represents a total number of lines.

perimeter to surface ratio:

$$\text{perimeter to surface ratio} = \frac{P}{A} \quad (3\text{-}4)$$

sphericity:

$$\text{sphericity} = \frac{2\sqrt{\pi A}}{P} \quad (3\text{-}5)$$

spherical disproportion:

$$\text{spherical disproportion} = \frac{P}{2\sqrt{\pi A}} \quad (3\text{-}6)$$

$$\text{a major axis length: major axis} = 4\sqrt{\lambda_{major}} \quad (3\text{-}7)$$

A major axis length is calculated by using a maximum principal component $\lambda_{major}$. The physical coordinate defining the pixel center in the region of interest is used for performing the principal component analysis. It is the same for the minor axis length.

$$\text{A minor axis length: minor axis} = 4\sqrt{\lambda_{minor}} \quad (3\text{-}8)$$

The minor axis length feature produces the second maximum axis length of an ellipsoid surrounding the region of interest, which is calculated by using the second maximum principal component $\lambda_{minor}$.

elongation:

$$\text{elongation} = \sqrt{\frac{\lambda_{minor}}{\lambda_{major}}} \quad (3\text{-}9)$$

B. First-order features (grey statistical features): it is assumed that M represents a set of all pixels in the hepatic tumor region, M (i) represents a pixel value of the $i^{th}$ pixel, and the following formula represents the definition of the intensity histogram as:

$$H(i) = \frac{n_i}{N_p}, i = 1, 2, \ldots N_g \quad (3\text{-}10)$$

wherein, i represents discrete intensity level, $N_p$ represents a total number of pixels in a hepatic tumor region image, $N_g$ represents a number of discrete intensity level types, $n_i$ represents a number of pixels of the discrete intensity level i in the hepatic tumor region image, and H(i) represents the occurrence frequency of pixels having the discrete intensity level i in the hepatic tumor region image.

The feature calculation formula contained is as follows:

energy:

$$\text{energy} = \sum_{i=1}^{N_p} [M(i) + c]^2 \quad (3\text{-}11)$$

wherein c is an optional value and represents a moving pixel intensity to prevent any negative value from occurring in M.

total energy $$\text{total energy} = V_{voxel}\sum_{i=1}^{N_p}[M(i)+c]^2 \quad (3\text{-}12)$$

entropy:

$$\text{entrophy} = -\sum_{i=1}^{N_g}H(i)\log_2[H(i)+\varepsilon] \quad (3\text{-}13)$$

wherein $\varepsilon$ represents a random small positive number.

an interquartile range: Interquartile range $n_{75}\text{-}n_{25}$ (3-14)

A robust mean absolute deviation is an average distance between each intensity value and each mean value calculated on a subset of original pixel matrices having a grey scale between the $10^{th}$ and $90^{th}$ percentiles (included);

a mean absolute deviation:

$$MAD = \frac{1}{N_P}\sum_{i=1}^{N_P}|M(i)-\overline{M}| \quad (3\text{-}15)$$

a robust mean absolute deviation:

$$rMAD = \frac{1}{N_{10-90}}\sum_{i=1}^{N_{10-90}}|M_{10-90}(i)-\overline{M}_{10-90}| \quad (3\text{-}16)$$

A robust mean absolute deviation is an average distance between each intensity value and each mean value calculated on a subset of original pixel matrices having a grey scale between the $10^{th}$ and $90^{th}$ percentiles (included);

skewness:

$$\text{skewness} = \frac{\mu^3}{\sigma^3} = \frac{\frac{1}{N_P}\sum_{i=1}^{N_P}(M(i)-\overline{M})^3}{\left(\sqrt{\frac{1}{N_P}\sum_{i=1}^{N_P}(M(i)-\overline{M})^2}\right)^3} \quad (3\text{-}17)$$

kurtosis:

$$\text{kurtosis} = \frac{\mu^4}{\sigma^4} = \frac{\frac{1}{N_P}\sum_{i=1}^{N_P}(M(i)-\overline{M})^4}{\left(\frac{1}{N_P}\sum_{i=1}^{N_P}(M(i)-\overline{M})^2\right)^2} \quad (3\text{-}18)$$

uniformity:

$$\text{uniformity} = \sum_{i=1}^{N_g}H(i)^2 \quad (3\text{-}19)$$

In addition, there are commonly used first-order statistical features including maximums, minimums, mean values, variances, and standard deviations.

C. Second-order features (texture features): features are extracted by using a grey-level co-occurrence matrix (GLCM), a grey-level run-length matrix (GLRLM), a grey-level size-zone matrix (GLSZM) and a neighborhood grey-tone difference matrix (NGTDM) of the image to describe textual distribution within the hepatic tumor.

GLCM: A GLCM sized as $N_g \times N_g$ is described as a second-order joint probability function of an image region limited by a mask, which is defined as $P(i, j|\delta,\theta)$. A $(i, j)^{th}$ element in this matrix represents a number of times that a combination of a pixel at the $i^{th}$ grade and a pixel at the $j^{th}$ grade occurs along an angle $\theta$ in the image which are separated apart by $\delta$ pixels. $\delta$ of the central pixel is defined as a distance having infinite norms.

GLRLM: In the grey-level run length matrix $P(i, j|\theta)$, the $(i, j)^{th}$ element describes a number of run lengths that the $i^{th}$ grey scale and the $j^{th}$ length occur in the image (ROI) along an angle $\theta$.

GLSZM: In the grey-level zone matrix $P(i, j)$, the $(i, j)^{th}$ element equals to a number of zones occurring in the image that have the $i^{th}$ grey scale and the $j^{th}$ dimension. GLSZM only calculates one matrix in each of all directions in the region of interest.

NGTDM: A neighborhood grey-tone difference matrix quantizes the difference between a neighborhood grey scale value and a mean grey scale value within the distance $\delta$. A sum of absolute differences of the $i^{th}$ grey scale is stored in the matrix. Assuming that $X_{gl}$ is a group of segmented volume pixels, if $X_{gl}(j_x, j_y, j_z) \in X_{gl}$ is a grey scale of a volume pixel at the position $(j_x, j_y, j_z)$, a mean grey scale in the neighborhood will be:

$$\overline{A}_i = \overline{A}(j_x, j_y, j_z) = \frac{1}{W}\sum_{k_x=-\delta}^{\delta}\sum_{k_y=-\delta}^{\delta}\sum_{k_z=-\delta}^{\delta}x_{gl}(j_x+k_x, j_y+k_y, j_z+k_z) \quad (3\text{-}20)$$

wherein $(j_x, j_y, j_z) \neq (0, 0, 0)$ and $x_{gl}(j_x+k_x, j_y+k_y, j_z+k_z) \in X_{gl}$. W is a number of pixels in the field.

D. Wavelet features: to filter an original 2D image by non-sampling 2D (two dimensional) wavelet transformation. The 2D image is considered as being constituted by a series of row vectors, and upon the wavelet filtering the original signal is segmented into two parts, high-frequency signals and low-frequency signals, which are then down sampled. The elements of row vectors subscripted by even numbers are reserved, so that the high frequency part obtains a corresponding high frequency matrix, and the low frequency signal part obtains a new low frequency matrix. Newly generated matrices respectively go through wavelet filtering and down sampling one more time for column vectors in order to obtain three high-frequency signals and a low-frequency signal. The above mentioned processes are then performed on the low-frequency signal for $J_{dec}$ times to finally obtain $J_{dec} \times 3$ high-frequency signals and a low-frequency approximated image. Dimensions in the present disclosure is set as decomposition of $J_{dec}=1$ to obtain four combinations of wavelet transformation images in total, namely $X_L$, $Y_L$, $X_L Y_H$, $X_H Y_L$, $X_H Y_H$, wherein $X_L Y_L$ represents images taking a low frequency band in the X direction and a low frequency band in the Y direction. A modulus square expression of the Daubechies wavelet applied is:

$$|m_0(\omega)|^2 = [\cos^2(\omega/2)]^N P[\sin^2(\omega/2)]$$

wherein, the wavelet has a discrete version as $$m_0(\omega) = \frac{1}{\sqrt{2}} \sum_{k=0}^{2N-1} h_k e^{-jk\omega},$$

$$P(y) = \sum_{k=0}^{N-1} C_k^{N-1+k} y^k,$$

$\omega$ is an angular vector, and $h_k$ is a parameter, and N represents the order of the wavelet. For 4 wavelet components resulting from the wavelet decomposition, the grey statistical features and the texture features are respectively calculated to obtain wavelet features.

In Step (4), features extracted in Step (3) are screened. The feature screening mainly starts in two aspects, namely, filter and wrapper:

i. Single-valued features are excluded. Likewise, features having variances that are too small are also filtered out.

ii. Features apparently irrelevant to pathological grading according to the mutual information filtering. The calculation formula for mutual information is:

$$I(X;Y) = \sum_{y \in Y} \sum_{x \in X} p(x,y) \log\left[\frac{p(x,y)}{p(x)p(y)}\right] \quad (4\text{-}1)$$

Wherein, $X_i$ represents an $i^{th}$ feature vector in the merged feature set, Y represents a label, p(x, y) is a joint probability density function of X and Y, and p(x) and p(y) are, respectively, marginal probability density functions of X and Y;

iii. Redundant features having correlation coefficients greater than 0.9 are removed by the correlation analysis. The calculation formula for a correlation coefficient is:

$$\rho = \frac{\sum_i (x_i - \bar{x})(y_i - \bar{y})}{\sqrt{\sum_i (x_i - \bar{x})^2 \sum_i (y_i - \bar{y})^2}} \quad (4\text{-}2)$$

wherein, $\rho$ is a calculated result of the correlation coefficient, $X_{ik}$ represents a $k^{th}$ element in the $i^{th}$ feature vector in the merged feature set, $x_{jk}$ represents a $k^{th}$ element in a $j^{th}$ feature vector in the merged feature set, and $\bar{x}_i$ and $\bar{x}_j$ respectively represent mean values of all elements in an $i^{th}$ feature vector and a $j^{th}$ feature vector in the merged feature set;

Then, the feature dimension reduction of a Lasso regression model is adopted to train those unhelpful feature parameters to be 0 in order to obtain a sparse solution. A cost function of the mentioned Lasso regression is:

$$J(\theta) = \frac{1}{2m} \sum_{i=1}^{m} (y^{(i)} - (wx^{(i)} + b))^2 + \lambda \|w\|_1 = \frac{1}{2} MSE(\theta) + \lambda \sum_{i=1}^{n} |\theta_i| \quad (4\text{-}3)$$

Wherein w is a vector of a length n, excluding a coefficient $\theta_0$ of an intercept term, $\theta$ is a vector of a length n+1, including the coefficient $\theta_0$ of an intercept term, m is a number of samples, n is a number of features, $x^{(i)}$ represents all feature values of the $i^{th}$ sample, and $y^{(i)}$ represents the label value of the $i^{th}$ sample. $\|w_1\|$ represents an L1 norm of the parameter w, and b represents a constant item. The complexity of the LASSO regression is controlled by the parameter $\lambda$. The binomial deviation is taken as a criterion for selecting a best value of $\lambda$ and then a value of $\lambda$ having the least binomial deviation is selected by a 10-fold cross validation method to apply to the Lasso regression model. The LASSO-selected features are multiplied by their respective coefficients and then the products are summed up to create a new assembled predictive marker.

In Step (5), features reserved in Step (4) without redundancy are integrated with those strongly correlated to the classification target. Considering the potential influence of clinical features, a multivariable logistic regression analysis is adopted to test a combination containing different clinical features and developed predictive markers; the Akaike information criterion (AIC) is used as a criterion to search backward a most proper combination thereof, and then the influence of binomial deviation and the number of variables during selection are put into the comprehensive consideration so as to select a model having the lowest AIC score as the final classifier for pathological grading of hepatocellular carcinoma. AIC is defined as:

$$AIC = -2 \ln(L) + 2k \quad (5\text{-}1)$$

wherein L is the maximum likelihood under this model, and k is a number of model variables.

The present disclosure adopts a multicenter method to train, test and verify the model. The specific scheme is as follows:

In Step (5.1), data samples from an institution are randomly divided into a training set and an internal test set by a ratio of 7:3, ensuring that each pathological grade has an equal sample ratio. The models are trained in the training set and tested in the internal test set to obtain the best model.

In Step (5.2), data samples from another institution are taken as an external independent validation set to verify the generalization ability of the model. The model performance is measured by a receiver operating characteristic curve (ROC) and an area under the curve (AUC).

The model can be expressed as:

$$\text{Grade} = \text{model}(\text{Index}_1, \text{Index}_2, \ldots, \text{Index}_n) \quad (5\text{-}2)$$

wherein, Grade is a prediction result of the pathological grading of hepatocellular carcinoma.

Another purpose of the present disclosure is to provide a piece of equipment for classifying hepatocellular carcinoma images by combining computer vision features and radiomics features, wherein the equipment includes:

a sampling module, used for segmenting the hepatic tumor region in the hepatocellular carcinoma image, re-sampling volume pixels of a segmented image of the hepatic tumor region into a space of a fixed size, normalizing a grey scale thereof, labeling the sample, and regarding the hepatic tumor region image containing the result label as a training set;

a feature extraction module, used for extracting computer vision features, radiomics features, and clinical features from the hepatic tumor region obtained by the sampling module; jointing the computer vision feature set and the radiomics feature set together to finally obtain a merged feature set and a clinical feature set after the joint of the computer vision feature set and the radiomics feature set;

a feature screening module, used for screening the merged feature set after joint, and combining and screening the feature set resultant from screening and the clinical feature set to obtain a final feature combination; and a classification module, used for classification according to the final feature combination.

In the present disclosure.

In the present disclosure, preferably, the sampling module includes:

a segmenting sub-module: used to segment a hepatic tumor region in the hepatocellular carcinoma image; and a pre-processing sub-module: resampling the volume pixels of the segmented hepatic tumor region image into a space of a fixed size, normalizing the grey scale grad and labeling the sample.

In the present disclosure, preferably, the feature extraction module includes:

a sub-module of computer vision feature extraction: used for extracting computer vision features including LoG filter features, LBP features, HOG features and haar-like features;

a sub-module of radiomics feature extraction: used for extracting radiomics features including morphological features, grey scale features, texture features, and wavelet features;

a sub-module of clinical feature extraction: used for extracting clinical features;

a sub-module of feature joint: used for jointing the computer vision feature set and the radiomics feature set to form a merged feature set.

In the present disclosure, preferably, the feature screening module includes:

a sub-module of the first-level feature screening: used for excluding single-valued features, features having variances less than a preset threshold, features having mutual information values less than a preset threshold, and features of correlation coefficients larger than 0.9; and a sub-module of the second level feature dimension reduction: used for adopting the feature dimension reduction in a Lasso regression model, and training unhelpful feature parameters to 0, so as to obtain a sparse solution and thus the merged feature set that has gone through screening.

Another purpose of the present disclosure is to provide a piece of equipment for classifying hepatocellular carcinoma images by combining computer vision features and radiomics features, wherein the equipment includes a storage and a processor:

the storage is used for storing a computer program; and the processor, when performing the computer program, is used for implementing the method for classifying the hepatocellular carcinoma images by combining the computer vision features and the radiomics features according to any one of schemes mentioned above.

Another purpose of the present disclosure is to provide a computer-readable storage medium that has a computer program is stored thereon and, when executed by a processor, implements the method for classifying the hepatocellular carcinoma images by combining the computer vision features and the radiomics features according to any scheme mentioned above.

Figure 3:
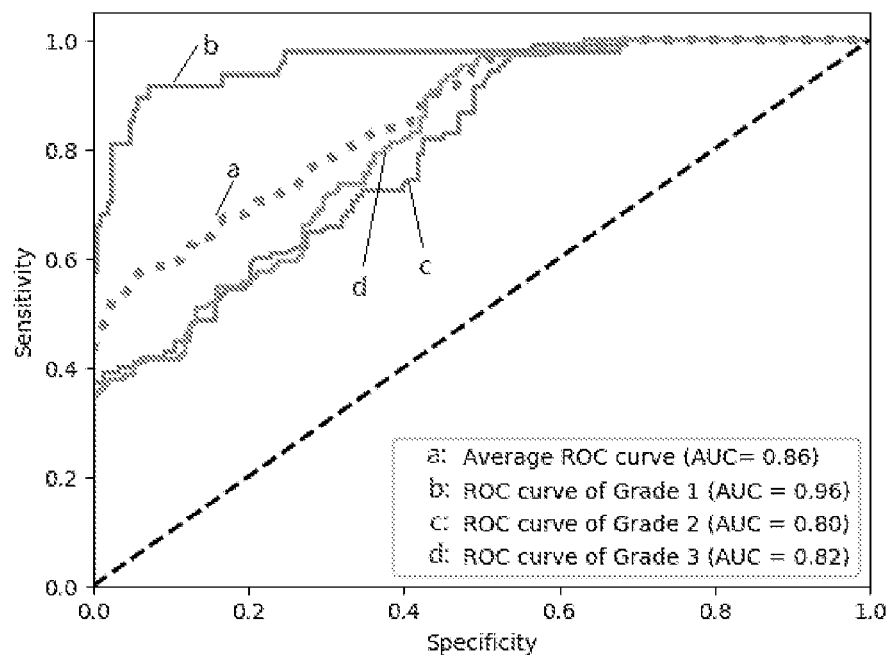
FIG. 3 is a performance testing curve of the embodiment in the present disclosure.

The specific effect of a classification method provided in the present disclosure will be further described below through an embodiment by using the method for classifying hepatocellular carcinoma images by combining computer vision features and radiomics features, and detailed steps thereof are discussed as above and will not be repeated herein. According to the present disclosure, after the model training is enabled in the training set and the parameter optimization is achieved in the internal test set, the performance test is finally performed on the independent validation set to obtain the ROC curve as shown in FIG. 3, and an average AUC value of 0.86 indicates the effectiveness of the model provided by the present disclosure on pathological grading of hepatocellular carcinoma.

What is claimed is:

1. A method for classifying hepatocellular carcinoma images by combining computer vision features and radiomics features, comprising:

step (1), obtaining and preprocessing a hepatocellular carcinoma image, wherein the preprocessing comprises: segmenting a hepatic tumor region in the hepatocellular carcinoma image, re-sampling volume pixels of a segmented image of the hepatic tumor region into a space of a fixed size, normalizing a grey scale thereof, and labeling a corresponding pathological grading result;

step (2), extracting computer vision features from the segmented image of the hepatic tumor region, wherein the computer vision features comprise Location of a Gaussian (LoG) filter features, Local Binary Patterns (LBP) features, Histogram of Oriented Gradients (HOG) features, and haar-like features;

step (3), extracting radiomics features from the segmented image of the hepatic tumor region, wherein the radiomics features comprise morphological features, grey scale features, texture features, and wavelet features;

step (4), jointing the computer vision features extracted in step (2) and the radiomics features extracted in step (3) together, and screening features in a merged feature set $X=\{X_1, X_2, \ldots, X_i, \ldots, X_n\}$ resulted from the joint, wherein n represents a number of feature vectors in the merged feature set, $X_i$ represents an $i^{th}$ feature vector in the merged feature set $X_i=\{x_{i1}, x_{i2}, \ldots, x_{im}\}$, $X_i$ represents an ith element in $X_i$, and m represents a number of elements in $X_i$; wherein the screening features in the merged feature set comprises:

step (4.1), firstly, excluding single-valued features, features having variances less than a preset threshold, features irrelevant to the corresponding pathological grading, and redundant features by univariate filtering;

wherein a relationship intensity between features and the corresponding pathological grading is measured through mutual information calculations, so that the features having mutual information values lower than the preset threshold are referred to as irrelevant to the pathological grading, and the mutual information calculations are performed according to:

$$I(X_i; Y) = \sum_{y \in Y} \sum_{x \in X_i} p(x, y) \log\left[\frac{p(x, y)}{p(x)p(y)}\right]$$

wherein, $X_i$ represents an $i^{th}$ feature vector in the merged feature set, Y represents a label, p(x, y) is a joint probability density function of X and Y, and p(x) and p(y) are, respectively, marginal probability density functions of X and Y;

the redundant features are those having correlation coefficients greater than 0.9, and a correlation coefficient is to be computed according to:

$$\rho = \frac{\sum_k (x_{ik} - \bar{x}_i)(x_{ji} - \bar{x}_j)}{\sqrt{\sum_k (x_{ik} - \bar{x}_i)^2 \sum_i (x_{jk} - \bar{x}_j)^2}}$$

wherein, $\rho$ is a calculated result of the correlation coefficient, $x_{ik}$ represents a $k^{th}$ element in the $i^{th}$ feature vector in the merged feature set, $x_{jk}$ represents a $k^{th}$ element in a $j^{th}$ feature vector in the merged feature set, and $\bar{x}_i$ and $\hat{x}_j$ respectively represent mean values of all elements in an $i^{th}$ feature vector and a $j^{th}$ feature vector in the merged feature set;

step (4.2), adopting a feature dimension reduction of a Least Absolute Shrinkage and Selection Operator (Lasso) regression model to train those unhelpful feature parameters to be 0 in order to obtain a sparse solution; wherein a cost function of the Lasso regression is:

$$J(\theta) = \frac{1}{2m} \sum_{i=1}^{m} (y^{(i)} - (wx^{(i)} + b))^2 + \lambda \|w\|_1 = \frac{1}{2} MSE(\theta) + \lambda \sum_{i=1}^{n} |\theta_i|$$

Wherein, m is a number of samples, n is a number of features, $x^{(i)}$ represents all feature values of an $i^{th}$ sample, $y^{(i)}$ represents a label value of the $j^{th}$ sample, w is a parameter vector of a length n, $\|w_1\|$ represents an L1 norm of the parameter vector w, b represents a constant coefficient, and $\lambda$ is a parameter for controlling a regression complexity, wherein a best value of $\lambda$ is selected by taking a binomial deviation as a criterion and then iterated by a 10-fold cross validation method to apply a $\lambda$ value of the binomial deviation in the Lasso regression model; and a predict score is obtained by multiplying Lasso-selected features by their respective coefficients to provide products and then summing the products;

step (5), after clinical features are obtained from a hepatic tumor region image and all the clinical features are deleted one by one, adopting a multivariable logistic regression, by combining the image with all feature matrices resulted from screening in step (4), to get a classifier for pathological grading of hepatocellular carcinoma for different combinations; using an Akaike information criterion (AIC) as a criterion to search backward a most proper combination thereof, and then according to an influence of the binomial deviation and the number of variables during selection selecting a model of a lowest AIC score as a final classifier for pathological grading of hepatocellular carcinoma which may input a best combined feature matrix; wherein the AIC is defined as:

AIC=−2 ln(L)+2k wherein L is a maximum likelihood under this model, and k is a number of model variables;

step (6), acquiring the hepatocellular carcinoma image to go through the pathological grading of hepatocellular carcinoma and processing according to step (1) to segment an image of the hepatic tumor region from which features of a same type as that of the best combined feature matrix said in step (5) are extracted as a feature matrix to be graded; and inputting the feature matrix to be graded into the classifier for pathological grading of hepatocellular carcinoma obtained in step (5) to output a pathological grading result of hepatocellular carcinoma.

2. The method for classifying hepatocellular carcinoma images by combining computer vision features and radiomics features according to claim 1, wherein the computer vision features said in step (2) comprise:

a. LoG filter features: LoG filter features are acquired by applying a Gauss-Laplace filter into an input image, generating an export image for each specified sigma value, and extracting intensity and texture features in multiple kinds of fineness from a LoG-filtered image;

b. LBP features: LBP features are acquired by applying an LBP operator to the hepatic tumor region image to get an LBP image, and extracting intensity and texture features from the LBP image;

c. HOG features: before performing an HOG algorithm, a hepatocellular carcinoma image is segmented into smaller sub-regions, histograms in a gradient direction are calculated based on pixels in cells, and the histograms of all cells are combined to form features;

d. Haar-like features: after the hepatocellular carcinoma image is converted into an integral image, an area of interest is quickly calculated on different scales by using the integral image, a rectangular area is defined at each pixel, and haar features of different types are calculated wherein each haar-like feature descriptor contains two jointed rectangles: a black block and a white block, and the haar-like features are calculated by:

$$g(x) = \sum_B B\_P - \sum_W W\_P$$

wherein, B represents a black rectangle having a pixel value of B_P; while W represents a white rectangle having a pixel value of W_P.

3. The method for classifying hepatocellular carcinoma images by combining computer vision features and radiomics features according to claim 1, wherein the morphological features said in step (3) comprise:

a surface area of a grid $$A: A = \sum_{i=1}^{N_f} A_i, \ A_i = \frac{1}{2} Oa_i \times Ob_i,$$

wherein $O_i a_i$ and $O_i b_i$ are edges of an $i^{th}$ triangle in the grid, which are constituted of vertexes $a_i$, $b_i$ and an origin O, $N_f$ represents a number of triangles in the grid;

a surface area of a pixel $$A_{pixel}: A_{pixel} = \sum_{k=1}^{N_v} A_k,$$

wherein $A_k$ represents a surface area of a single pixel $A_k$, and $N_v$ represents a number of pixels;

a perimeter $$P : P = \sum_{i=1}^{N_w} P_i,$$

$P_i = \sqrt{(a_i - b_i)^2}$, wherein $a_i$ and $b_i$ are vertexes of an $i^{th}$ line in a peripheral grid, $P_i$ represents a perimeter of each line in a grid circumference, and $N_w$ represents a total number of lines;

a perimeter to surface ratio P/A;

sphericity $$\frac{2\sqrt{\pi A}}{P};$$

spherical disproportion $$\frac{P}{2\sqrt{\pi A}};$$

a major axis length $4\sqrt{\lambda_{major}}$, wherein $\lambda_{major}$ represents a maximum principal component value resulting from a principal component analysis performed at a physical coordinate of a pixel center; and the major axis length feature produces a maximum axis length of an ellipsoid surrounding the region of interest, which is calculated by using the maximum principal component value $\lambda_{major}$;

a minor axis length feature $4\sqrt{\lambda_{minor}}$, wherein $\lambda_{minor}$ represents a second maximum principal component value resulting from the principal component analysis performed at the physical coordinate of the pixel center; and the minor axis length feature produces a second maximum axis length of an ellipsoid surrounding the region of interest, which is calculated by using the second maximum principal component value $\lambda_{minor}$;

elongation:

$$\sqrt{\frac{\lambda_{minor}}{\lambda_{major}}} [[.]];$$

and grey statistical features computed in step (3) are features resulting on the basis of the intensity histogram, which represent a distribution of pixel intensities within a hepatic tumor region, wherein the intensity histogram is defined by:

$$H(i) = \frac{n_i}{N_p},$$

$i = 1, 2, \ldots N_g$ wherein, i represents a discrete intensity level, $N_p$ represents a total number of pixels in the hepatic tumor region image, $N_g$ represents a number of discrete intensity level types, $n_i$ represents a number of pixels of the discrete intensity level i in the hepatic tumor region image, H(i) represents an occurrence frequency of pixels having the discrete intensity level i in the hepatic tumor region image;

it is assumed that M represents a set of all pixels in the hepatic tumor region, and M (i) represents a pixel value of an $i^{th}$ pixel;

the grey statistical features comprise:

energy:

$$energy = \sum_{i=1}^{N_p} [M(i) + c]^2,$$

wherein c is optional for representing a moving pixel intensity to prevent any negative value from occurring in M;

total energy:

$$\text{total energy} = V_{voxel} \sum_{i=1}^{N_p} [M(i) + c]^2;$$

an entropy:

$$entropy = -\sum_{i=1}^{N_g} H(i) \log_2 [H(i) + \varepsilon],$$

wherein $\varepsilon$ represents a random small positive number;

an interquartile range: Interquartile range=$n_{75} - n_{25}$, wherein $n_{25}$ and $n_{75}$ represent, respectively, numbers of pixels having discrete intensity levels at $25^{th}$ and $75^{th}$ percentiles;

a mean absolute deviation:

$$MAD = \frac{1}{N_P} \sum_{i=1}^{N_P} |M(i) - \overline{M}|,$$

wherein $\overline{M}$ represents a mean value of frequencies;

a robust mean absolute deviation:

$$rMAD = \frac{1}{N_{10-90}} \sum_{i=1}^{N_{10-90}} |M_{10-90}(i) - \overline{M}_{10-90}|,$$

wherein $M_{10-90}(i)$ represents a pixel value of the $i^{th}$ pixel with a discrete intensity level between $10^{th}$ and $90^{th}$ percentiles, $\overline{M}_{10-90}$ represents a mean value, and $N_{10-90}$ represents a number of types of discrete intensity levels between $10^{th}$ and $90^{th}$ percentiles;

a robust mean absolute deviation is an average distance between each intensity value and each mean value calculated on a subset of pixel matrices having a grey scale between the $10^{th}$ and $90^{th}$ percentiles (included);

skewness:

$$\text{skewness} = \frac{\mu^3}{\sigma^3} = \frac{\frac{1}{N_P}\sum_{i=1}^{N_P}(M(i)-\overline{M})^3}{\left(\sqrt{\frac{1}{N_P}\sum_{i=1}^{N_P}(M(i)-\overline{M})^2}\right)^3};$$

kurtosis:

$$\text{kurtosis} = \frac{\mu^4}{\sigma^4} = \frac{\frac{1}{N_P}\sum_{i=1}^{N_P}(M(i)-\overline{M})^4}{\left(\frac{1}{N_P}\sum_{i=1}^{N_P}(M(i)-\overline{M})^2\right)^2};$$

uniformity:

$$\text{uniformity} = \sum_{i=1}^{N_g}p(i)^2;$$

in addition, the computer vision features also comprise maximums, minimums, mean values, variances, and standard deviations;

the texture features said in step (3) are features derived on the basis of a grey-level co-occurrence matrix (GLCM), a grey-level run-length matrix (GLRLM), a grey-level size-zone matrix (GLSZM) and a neighborhood grey-tone difference matrix (NGTDM);

the wavelet features said in step (3) filter an original 2D image by non-sampling 2D wavelet transformation, wherein the original 2D image is considered as being constituted by a series of row vectors, and upon the wavelet filtering the original signal is segmented into two parts, high-frequency signals and low-frequency signals, which are then down sampled, the elements of row vectors subscripted by even numbers are reserved to generate a high-frequency matrix and a low-frequency matrix;

newly generated matrices respectively go through wavelet filtering and down sampling for column vectors in order to obtain three high-frequency signals and a low-frequency signal; the above mentioned processes are then performed on the low-frequency signal for $J_{dec}$ times to finally obtain $J_{dec} \times 3$ high-frequency signals and a low-frequency approximated image; and a modulus square expression of a Daubechies wavelet applied is:

$$|m_0(\omega)|^2 = [\cos^2(\omega/2)]^N P[\sin^2(\omega/2)]$$

wherein, the wavelet has a discrete version as $$m_0(\omega) = \frac{1}{\sqrt{2}}\sum_{k=0}^{2N-1}h_k e^{-jk\omega},$$

$$P(y) = \sum_{k=0}^{N-1}C_k^{N-1+k}y^k,$$

$\omega$ is an angular vector, $h_k$ is a parameter, and N represents an order of the wavelet; and grey statistical features and texture features are respectively calculated for 4 wavelet components resultant from a wavelet decomposition, so as to obtain the wavelet features.

4. A device for classifying hepatocellular carcinoma images by combining computer vision features and radiomics features, comprising a storage and a processor, wherein:
the storage is used for storing a computer program; and
the processor, when performing the computer program, is used for implementing the method for classifying the hepatocellular carcinoma images by combining the computer vision features and the radiomics features according to claim 1.

5. A device for classifying hepatocellular carcinoma images by combining computer vision features and radiomics features, comprising a storage and a processor, wherein:
the storage is used for storing a computer program; and
the processor, when performing the computer program, is used for implementing the method for classifying the hepatocellular carcinoma images by combining the computer vision features and the radiomics features according to claim 2.

6. A device for classifying hepatocellular carcinoma images by combining computer vision features and radiomics features, comprising a storage and a processor, wherein:
the storage is used for storing a computer program; and
the processor, when performing the computer program, is used for implementing the method for classifying the hepatocellular carcinoma images by combining the computer vision features and the radiomics features according to claim 3.

* * * * *